United States Patent [19]

Molle

[11] Patent Number: 5,600,651
[45] Date of Patent: Feb. 4, 1997

[54] BINARY LOGARITHMIC ARBITRATION METHOD FOR CARRIER SENSE MULTIPLE ACCESS WITH COLLISION DETECTION NETWORK MEDIUM ACCESS CONTROL PROTOCOLS

[76] Inventor: Mart L. Molle, 7509 Whitegate Ave., Riverside, Calif. 92506

[21] Appl. No.: 418,481

[22] Filed: Apr. 7, 1995

[51] Int. Cl.$^6$ ............................................... H04L 12/413
[52] U.S. Cl. ............................................................ 370/448
[58] Field of Search ................................. 375/85.2, 85.3, 375/85.6; 340/825.5; 395/303, 305

[56] References Cited

U.S. PATENT DOCUMENTS

| | | | |
|---|---|---|---|
| 4,063,220 | 12/1977 | Metcalfe et al. | 340/825.5 |
| 4,536,875 | 8/1985 | Kume et al. | 370/85.3 |
| 4,689,785 | 8/1987 | Toyonaga et al. | 370/85.3 |

OTHER PUBLICATIONS

ANSI/IEEE Standard 802.3, 1993, p. 45.
Shenker, S., "Some Conjectures on the Behavior of Acknowledgement–Based Transmission Control of Random Access Communication Channels", ACM Sigmetrics '87, 1987, pp. 245–254.
Melas, R. P., "On the Sensitivity of Ethernet Performance To Inter–Packet Spacing Under Batch Poisson Traffic", 1991. Masters Thesis, University of Toronto.
Ramakrishnan and Yang, "The Ethernet Capture Effect:Analysis and Solution", Proceedings of 19th Conference on Local Computer Networks, 1994, pp. 228–240.
Hayes, W., "An Efficient Two–Node Ethernet Protocol Requiring Changing Only One Node". pp. 1–17.
Cunningham, III and Meditch, "Distributed Retransmission Controls for Slotted, Nonpersistent, and Virtual Time CSMA", IEEE Transactions on Communications, Jun. 1988, vol. 36, No. 6, pp. 685–691.
Molle, M. L., "Conflict–Resolution Algorithms, The Froehlich/Kent Encyclopedia of Telecommunications", vol. 4, pp. 381–397.
Sohraby, K., et al., "On The Performance and Stability of a Simple Gated Conflict Resolution Algorithm", Kybernetika, 1987, vol. 24, No. 3, pp. 252–260.
Molle and Polyzos, "Conflict Resolution Algorithms and Their Performance Analysis". 56 pages.
Lui and Wise, "Performance of a CSMA/CD Protocol for Local Area Networks", IEEE Journal on Selected Areas in Communications, 1987, vol. SAC–5, No. 6, pp. 948–955.
Paterakis and Papantoni–Kazakos, "Simple Window Random Access Algorithm with Advantageous Properties", IEEE Transactions on Information Theory, 1989, vol. 35, No. 5, pp. 1124–1128.

*Primary Examiner*—Benedict V. Safourek
*Attorney, Agent, or Firm*—Fish & Richardson, P.C.

[57] ABSTRACT

A medium access control sublayer CSMA/CD protocol which is interoperable with Standard 802.3. The collision counters of transmitting and non-transmitting hosts are updated symmetrically. The counters are incremented after each collision, and are reset after a successful transmission of a burst of packets or after a sufficient delay in transmission. The host generates a random backoff delay from the collision counter using truncated exponential distribution.

20 Claims, 3 Drawing Sheets

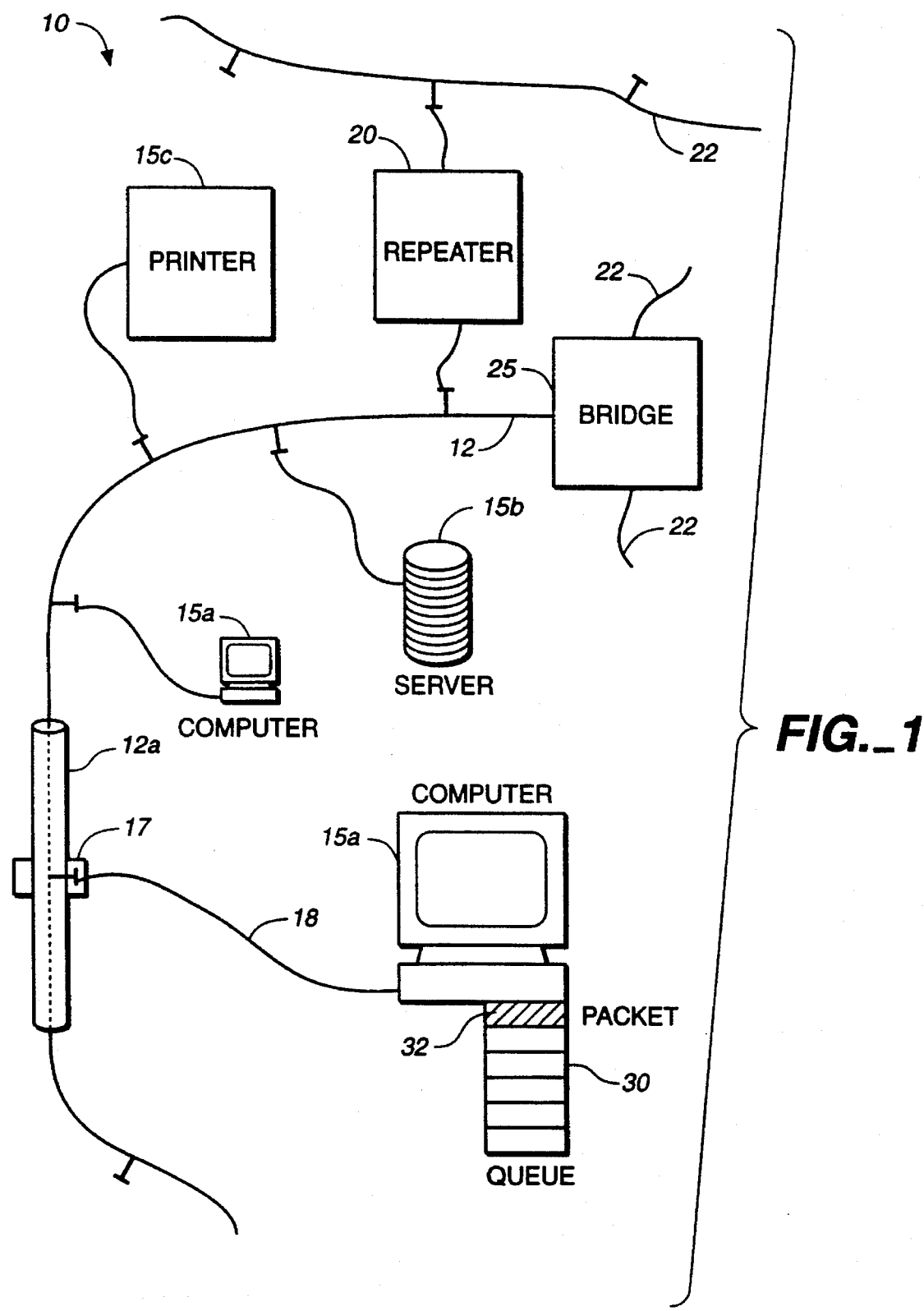
FIG._1

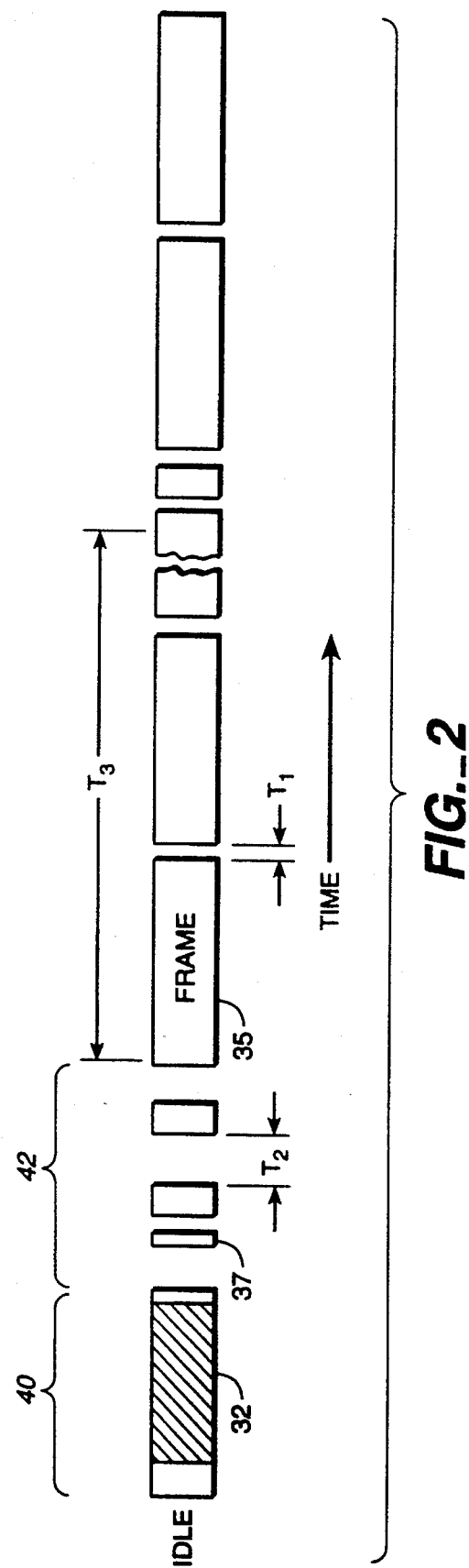

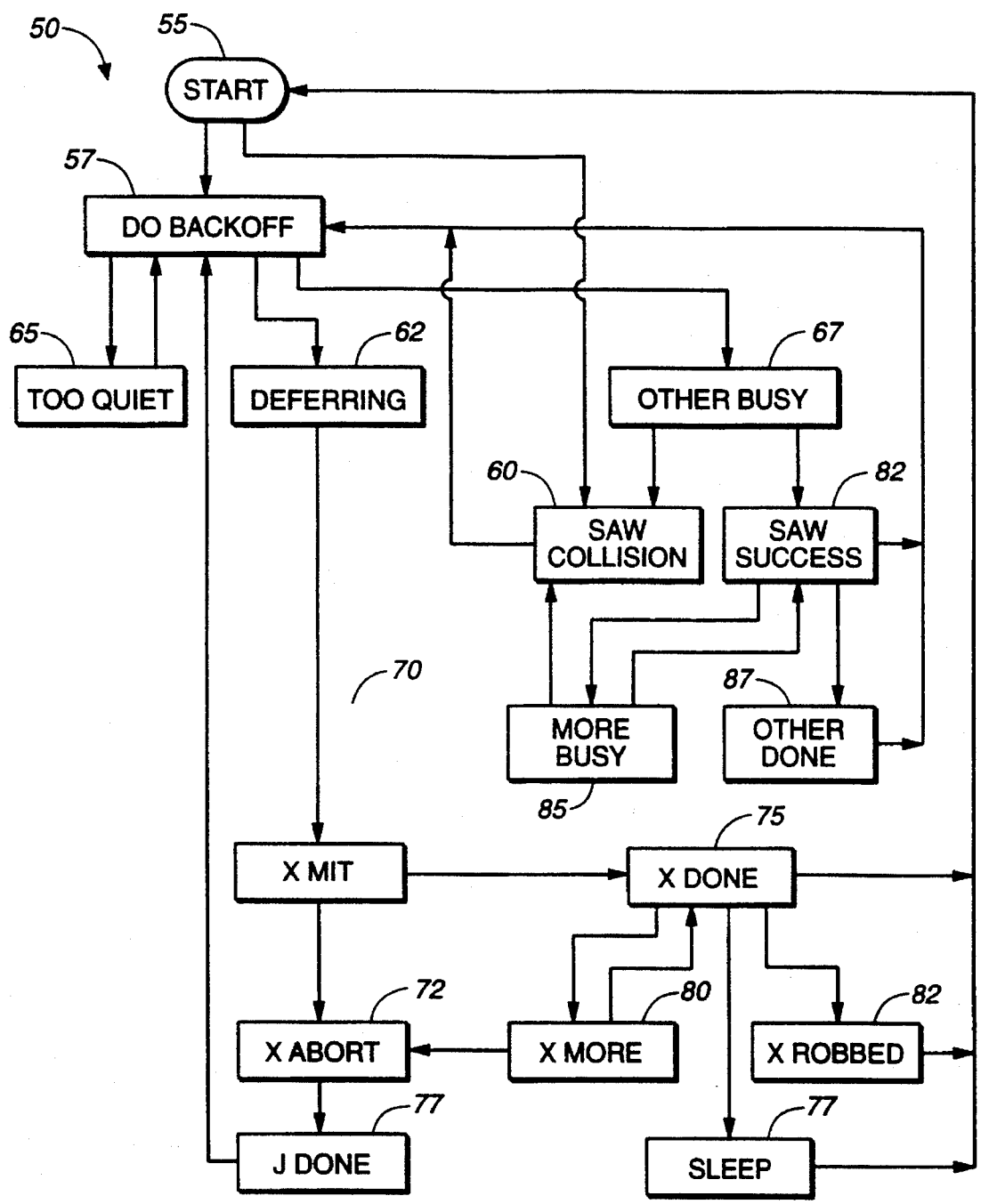
FIG._3

BINARY LOGARITHMIC ARBITRATION METHOD FOR CARRIER SENSE MULTIPLE ACCESS WITH COLLISION DETECTION NETWORK MEDIUM ACCESS CONTROL PROTOCOLS

BACKGROUND OF THE INVENTION

The present invention relates to medium access control sublayer protocols for a shared medium, and more particularly to carrier sense multiple access with collision detection (CSMA/CD) protocols.

In any network in which multiple hosts are connected to a single shared communications channel (a multiaccess system), there must be a method to resolve which host gets to use the channel when there is contention. In a multiaccess system, data sent by one host will be received by all other hosts. However, if two different hosts attempt to transmit data simultaneously, there is a collision, and the data is lost. The various methods to resolve contests between the hosts and recover from collisions are called Medium Access Control (MAC) sublayer protocols.

Protocols in which multiple hosts listen for a carrier (i.e. a transmission) to determine whether the channel is currently busy are called carrier sense multiple access (CSMA) protocols. By waiting until the channel is free to begin transmitting, some collisions are avoided.

One type of CSMA protocol is the 1-persistent CSMA. In this protocol, when a host has data to transmit, it listens to the channel. If the channel is busy, then the host continuously monitors the channel until it becomes idle. Once the channel is idle, the host begins to transmit its data. If there is a collision, each host waits a random amount of time after a collision before trying again. One host will win the contest by picking the shorter internal of time. A collision occurs only if the two hosts pick identical numbers, or if a new host joins. In another variation called a P-persistent CSMA, the host has a certain probability p of transmitting data, and a probability of 1-p of waiting for a set period.

An improvement over standard CSMA protocol is for the host to cease transmitting immediately if it detects a collision. By ending transmissions after a collision is detected, time and bandwidth is conserved. These protocols are called CSMA/CD protocols. A host may detect a collision by comparing the data that it transmits to the signal it measures on the channel.

Collisions do occur in the 1-persistent CSMA/CD. First, the propagation delay on the channel may create collisions. If a second host becomes ready to transmit after a first host begins sending, but before the first host's signal reaches the second host then the second host will detect the channel as idle, begin transmitting and cause a collision. Second, even if the propagation delay is small, two or more that are ready to transmit data at then end of another transmission will do so simultaneously, resulting in a collision. Although a P-persistent CSMA/CD protocol reduces the chance of simultaneous transmissions by new hosts, there is still a probability of $P_2$ (for two active hosts) of collision.

The Institute of Electrical and Electronics Engineers (IEEE) has produced several standards for MAC protocols. IEEE Standard 802.3 has been universally adopted for the 1-persistent CSMA/CD protocol. In the 802.3 Standard, each host that has data to transmit waits until it detects an idle channel, and then begins transmitting.

The 802.3 Standard uses the binary exponential backoff (BEB) method to dynamically adapt to the number of hosts trying to send to reduce collisions. If a host detects a collision, it waits a random integer number of "slot times" before repeating the cycle. The slot time is defined as the time required to transmit 512 bits over the network. This value was determined by the worst case round trip propagation delay between hosts allowed by Standard 802.3 for 10 Mbps networks, and has been preserved in the new Standard 802.3u for 100 Mbps networks.

If two different hosts pick the same random number of slot times, a second collision will occur. The maximum random number increases as the number of collisions increases. In the BEB method, the random number is between zero and $2^{min(n,10)}-1$, where the counter n is the number of collisions experienced by this packet. Therefore, after the first collision, the host waits zero or one slot time. After the second collision, the host waits zero, one, two, or three slot times. However, after 10 collisions, the maximum random number is frozen at 1023. In addition, after 16 collisions, the controller reports a failure back to the host. Following a successful transmission, the counter n in the successful host is reset to zero.

The MAC sublayer protocol currently used with Ethernet can cause significant performance problems. Since collisions waste channel bandwidth, it is vital that the number of collisions be minimized to decrease the load on the channel. In addition, collisions can generate more collisions through positive feedback when the retransmitted packets compete with later arrivals. A protocol may be described as stable if it avoids the positive feedback effect. Unfortunately, it is not clear whether Ethernet's BEB method is stable.

Even if Ethernet's BEB method is stable, the dynamics represent a poor scheduling discipline. The BEB method results in a reverse lottery in which certain packets are selected for exceptionally long delays, while most other packets are transmitted as soon as they reach the head of the transmit queue.

It is important to distinguish the perceptions of the service provider from the user. The primary concern of the service provider is throughput; whenever there is data in the system in need of transmission, the network should be engaged in delivering it. The users, on the other hand, are primarily concerned with delay. Delay consists both of waiting time, the time that elapses from the generation of a data packet to its arrival at the head of the transmit queue, and access time, the time that data packet spends at the head of the transmit queue. Human users have a strong dislike for unpredictability. In many applications, such as voice or video, delay variance is as important as the average delay.

Under BEB, the collision counter (equal to number n above) of a given host is updated only in response to actual transmission attempts by that host. Consider several active hosts each with several data packets in its queue. Once there is a successful packet transmission, only the "winner" will reset its collision counter to zero. First, the winning host is free to transmit its next packet immediately, while other hosts may have a retry time that is longer than the transmission packet time. Second, at the next collision, the winner randomly selects its retry time from the smallest possible interval, whereas the other hosts randomize their retry times over a much larger interval. Therefore, the first winning host is likely to capture the network repeatedly until its transmit queue is empty. Those host which have transmitted recently are about one-hundred times more likely to acquire the channel than others. This "last-in, first-out" system results in unacceptable variations in the delay time. Modifications to BEB have been proposed in order to eliminate the unfairness of the capture effect in the standard protocol, but their effectiveness is limited to networks with two nodes. In addition, BEB could be avoided by using published methods to stabilize CSMA protocols using a conflict resolution algorithm. However, these alternatives are not interoperable with the Standard 802.3 protocol. Furthermore, they require the hosts to monitor the channel continuously for a very long time, and/or suffer from the same "last-in, first-out" unfairness as BEB.

On the other hand, a capture effect may help system performance in certain circumstances. Under reasonably heavy load conditions, allowing a single host to capture the channel reduces the relative amount of time spent resolving contests. This increases the percentage time that the channel is engaged in delivering data and improves throughput.

However, the current MAC protocol for Ethernet is not a work conserving scheduler. In a work conserving system the shared resource is always engaged in useful activity, if there is at any host waiting to use the channel. However, the BEB method does not conserve work during periods of congestion. Some unlucky hosts will suffer multiple collisions, take a large backoff delay time, and "sleep" through the end of a congested period. Consequently, the resource will be sitting idle even though there is data waiting to be transmitted.

Also, the BEB method is slow in adapting to transient overload conditions. On occasion, a large number of hosts may start transmitting simultaneously. In the BEB method the average time to the first successful transmission after such an overload is linearly proportional to the number of active hosts.

Furthermore, the BEB method is not capable of handling the Ethernet standard maximum of hosts. In fact, the BEB method is bistable with more than 225 hosts, and is unstable with more than several hundred hosts. In a situation where a large number of hosts attempt to transmit packets at the same time, the system may enter a degraded operating mode in which almost every attempt to send data results in a collision, delaying a successful transmission indefinitely. The degenerated operating mode is particularly likely if the number of hosts is much larger than 225. This is because in the degenerated operating mode, the probability that a given host transmits in each slot is approximately $1/225$. One may compute this figure by summing the average number of slots it takes for a single host to "wrap around" on the sixteenth collision.

An additional problem with the BEB method is that an excessive collision error does not indicate that something is wrong with the network. Under the BEB, an excessive collision error is reported whenever a given host experiences 16 collisions in a row. However, the probability of a repeat collision on a retransmission attempt does not decay with the number of retries. Thus, since an excessive collision error is a normal event on a modestly active network, the error is not useful to higher network management functions in the diagnosis of failure conditions.

In view of the foregoing, an object of the present invention is to provide an improved MAC sublayer CSMA/CD protocol which is interoperable with the currently installed Ethernet protocol using the BEB method.

Another object of the present invention is to reduce network delay time and variance while maintaining current throughput capacity.

Yet another object of the present invention is to provide a fairer scheduling discipline to avoid monopolization of the channel by a limited number of hosts while still taking advantage of the capture effect to improve network capacity.

Still another object of the present invention is to decrease the reaction time of a network to a transient overload and to stabilize a network with up to one-thousand and twenty-four hosts.

A further object of the present invention is to make the excessive collision error a useful diagnostic signal.

Additional objects and advantages of the invention will be set forth in the description which follows and in part will be obvious from the description, or may be learned by practice of the invention. The objects and advantages of the invention may be realized and obtained by means of the instrumentalities and combinations particularly pointed out in the claims.

SUMMARY OF THE INVENTION

The present invention is directed to the operation of a host, which may have data to transmit, in a network having a plurality of hosts connected to a shared channel. According to the invention, the host provides a counter which is incremented when any of the hosts are involved in a collision and which is reset when any host successfully transmits a burst of packets, or after a host ceases transmitting for predetermined period. The host generates a backoff delay from a random number exponentially weighted by the counter each time the counter is incremented or reset. The host transmits its data at the expiration of the backoff delay, unless another host is transmitting, in which case the host waits while the other host is transmitting for a collision, for the other host to successfully transmit a burst of packets, or for the other host to ceases transmitting for predetermined period.

BRIEF DESCRIPTION OF THE DRAWING

The accompanying drawings, which are incorporated in and constitute a part of the specification, schematically illustrate a preferred embodiment of the invention, and together with the general description given above and the detailed description given below, serve to explain the principles of the invention.

FIG. 1 is a schematic illustration of an Ethernet network.

FIG. 2 is a hypothetical timeline showing activity on the network according to the present invention.

FIG. 3 is a state diagram illustrating the present invention.

DESCRIPTION OF THE PREFERRED EMBODIMENTS

Referring now to FIG. 1, network 10 consists of a channel 12 which is shared by multiple hosts. Possible hosts include computers 15a, file server 15b, printer 15c, and other known devices. In the original Ethernet, channel 12 is a coaxial cable 12a. A transceiver 17 and a transceiver cable 18 connect host 15a, for example, to the channel 12. The Ethernet is described in detail in U.S. Pat. No. 4,063,220, which is incorporated herein by reference. Additional channels 22 may be connected to channel 12 by repeater 20 or bridge 25. Hosts may not be more than 2.5 kilometers apart or separated by more than four repeaters. The longest possible round trip for a signal is 512 bits. As the maximum bandwidth for Ethernet is one-hundred million bits per second (Mbps), other technologies, such as optical fiber or twisted pair cabling, may be used for channel 12 to provide a broader bandwidth. The present invention is not limited to implementation in an Ethernet, but may be applied to any network that uses the CSMA/CD protocol, and specifically a 802.3 sublayer protocol.

Each host will have a transmission queue 30 for holding data packets that the host needs to transmit. In general, a host will use a "first in, first out" system where the earliest packet 32 placed in the queue 30 will be the first packet to be transmitted once channel 12 is available to the host.

As shown by FIG. 2, the host will transmit data in a frame 35. Frame 35 consists of data packet 32, and additional information such as a destination address, a source address, a field length, padding, a checksum, a frame delimiter and a preamble. Although frames according to the present invention have a minimum size of sixty-four bytes and a maximum size of 1500 bytes, other hosts attached to channel 12 may not operate under the same restrictions. In the present invention the channel 12 will alternate between idle periods, transmission periods 40, and arbitration periods 42.

Between each frame transmitted in succession by the same host there is an interframe gap $T_1$ of approximately 96 bits. To ensure detection of collisions when one host begins transmitting just before the carrier signal from another host reaches it, the slot time $T_2$ is set to 512 bits. After channel capture period $T_3$, a non-transmitting host will reset its backoff delay and possibly attempt to transmit. A transmitting host operating according to the present invention will not transmit for more than the channel capture period $T_3$, before it returns to the arbitration mode and resets its backoff delay. Holding period $T_3$ is preferably set at 1500 bytes.

In order to implement the present invention, the hosts maintain the following variables used by the method described in detail below:

| | |
|---|---|
| attemptLimit | the maximum number of collisions before the collision counter is reset and an excessive collision error is sent, set to 16 in Ethernet, but recommended to be increased to 20 in the present invention |
| Back | the backoff delay, calculated each time the collision counter is changed |
| BurstLength | the channel holding period, preferably set to 1500 bytes |
| BurstSpace | a constant set to 192 bits, representing the delay while active hosts check to see if a successful host will continue transmitting |
| BurstStart | a variable marker to indicate the beginning of a burst of frame by a single host |
| CCounter | the collision counter |
| CurrentTime | the current time |
| interFrameGap | the minimum time between frames, $T_1$ |
| HostResetTime | the time required for a transmitting host to reset and transmit a new packet |
| MaxIdle | the collision counter will be decremented if the channel is idle for more than this constant, which is set to 1024 bits |
| slotTime | defined as the time to transmit 512 bits over the network; the backoff delay is an integer multiple of the slot time, $T_2$ |

Turning now to FIG. 3, a state diagram for a host operating according to a method 50 of the present invention is shown. The method 50 may be called a binary logarithmic arbitration method (BLAM).

The host begins in state Start 55 when the host generates its first data packet after a period of inactivity. At the beginning of state Start 55, CCounter is set to an initial value, preferably 1, and BurstStart is set as undefined. Then the host checks for the presence of a carrier. If no carrier is present, the host proceeds immediately to state DoBackoff 57. If a carrier is present, the host waits and checks for the end of the carrier or a collision. If the host senses a collision, the host proceeds to state SawCollision 60. If the host senses the end of the carrier, it proceeds to state DoBackoff 57. Note that in the preferred embodiment the host does not begin collision detection until it has a data packet to transmit.

CCounter need not be set to an initial value of 1. Setting an initial value of 1 makes the host use a delayed, rather than immediate, transmission rule for the first attempt. The delayed transmission rule is interoperable with regular Ethernet hosts, and forces all new hosts to begin an arbitration period in state DoBackoff 57.

However, initializing CCounter to 1 creates a slight loss in efficiency where only one host is active, because it causes unnecessary delays. One possible solution is to add additional states to allow a new active host to operate under the BEB method, and switch to BLAM once a collision occurs. For example, the CCounter of new active hosts might be set to 0, and incremented directly to 2 in state SawCollision 60. Additionally, multiple priority classes could be created by initializing CCounter to smaller or larger values for high or low priority traffic, respectively.

In state DoBackoff 57, having just updated CCounter, all active hosts are ready to select a new backoff delay. To allow backward compatibility with standard Ethernet, hosts involved in a collision are allowed to begin their backoff interval at the end of their own jam signal instead of at the end of the carrier. Otherwise, there should be no carrier.

Once in state DoBackoff 57, the host calculates a backoff delay, Back, using the truncated binary exponential distribution. Back equals a random integer between 0 and $2^{min(CCounter, 10)} - 1$ multiplied by slotTime.

If Back equals zero, then the host proceeds directly to state Deferring 62.

If Back is greater than the constant MaxIdle, then the host sets a timeout until CurrentTime+MaxIdle. If the host does not detect a carrier by the end of the timeout, then it proceeds to state TooQuiet 65. If the host does detect a carrier during the timeout, then it proceeds to state OtherBusy 67.

If Back is less than or equal to the constant MaxIdle, then the host sets a timeout until CurrentTime+Back. If the host detects a carrier during the timeout, then it proceeds to state Otherbusy 67. If the timeout expires without detection of a carrier, then the host proceeds to state Deferring 62.

If the channel is idle while hosts have packets to deliver, then the system is not operating efficiently. This may occur when the estimated number of active hosts has become too large. We assume that the estimate is incorrect if a period longer than MaxIdle passes without a carrier. State TooQuiet 65 simply decrements the collision counter CCounter by one, to a minimum of one. Then the host returns to state DoBackoff to compute a new delay.

Alternately, a more complicated protocol would update the backoff interval after a change in CCounter. Specifically, Back could be set to floor(Back/2)−slotTime. This protocol has the advantage of ensuring that any host that randomly selected Back equal to MaxIdle would not have to change its scheduled transmission time.

A host in state Deferring 62 is committed to a transmission attempt. The host waits for a time equal to the interFrameGap to expire, and then proceeds to state Xmit 70.

Once in state Xmit 70, the host first sets the variable BurstStart to CurrentTime. The host then beginnings transmission of a single frame. If a collision is detected during transmission of the frame, the host proceeds to state XAbort 72. If the host completes the transmission, then the host proceeds to state XDone 75. A transmission subroutine controls the channel.

If the transmitting host detects a collision during transmission of a frame, then it enters state XAbort 72. Once in state XAbort 72, the host sets BurstStart as undefined and increments CCounter by one. Then, if necessary, the host completes transmission of the frame preamble. After the preamble is finished, the host transmits a jam pattern and proceeds to state JDone 77. The jam pattern reinforces consensus among the hosts that there was a collision.

In state JDone 77, the host detects whether the collision counter has exceeded the maximum number of attempts. If it has, then the collision counter is reset to 1, and an excessive collision error is reported. Otherwise, the host then waits for the the incoming signal or JAM pattern to finish, and then proceeds to state DoBackoff 57.

If the transmitting host completed a successful data packet transmission, then it enters state XDone 75. In order to increase channel efficiency in the presence of short packets, the present invention allows a successful host to continue to transmit packets until a channel capture period expires. Unlike the capture effect of the BEB, the present invention places a deterministic limit to the channel capture period. In addition, by resetting all collision counters after a successful transmission, the present invention avoids the serious "last-in, first-out" delays caused by the BEB method.

The host in state XDone 75 is entitled to continue its current burst of frames until the channel capture period runs out. However, the host must be able to begin transmitting before the other hosts time out and enter state OtherDone.

The host checks to see whether its transmission queue is empty. If the transmission queue is empty, then the host enters state Sleep 77.

If the host has packets to transmit, first it checks to see whether it can begin its next packet transmission before the channel holding timer expires, i.e. CurrentTime−BurstStart≧BurstLength−max {interFrameGap, HostResetTime}. Second, the host checks to see if the interpacket spacing will be too large to prevent the other hosts from triggering their inactivity timers, i.e. BurstSpace−HostResetTime≧interFrameGap/2.

The value of BurstSpace is based on the fact that the interframe spacing between two consecutive packets from the same source can change by, at most, 47 bit times due to variability at repeaters. Therefore, if a host transmits its next packet within 96 bits of an end of carrier, then all other hosts will detect a start-of-carrier event before their BurstSpace expires, and will not interfere with the successful host.

If either of the above conditions for end of burst is met, then the host sets BurstStart as undefined, and returns to state Start 55 to begin a new arbitration process. This forces the host to relinquishes control of the channel following a successful burst of data packets. If neither condition is met, then the host waits for the host interface to be reset (if necessary). If no carrier is detected before the host interface is reset, then the host proceeds to state XMore 80. Otherwise, the host goes to state XRobbed 82.

In state XMore 80, the successful transmitting host expects to transmit another packet without interference. However, there is the possibility that newly active hosts, and hosts using the old Ethernet protocol, will not delay to detect the carrier, and will create a collision.

First, the host waits for a time period equal to the interframe gap. Then, the host begins transmitting the next packet in the transmission queue. While the host is transmitting, it watches for a collision. If the transmission is completed without a collision, then the host returns to state XDone 75, but if there is a collision, then the host enters state XAbort.

When a first host that is attempting to capture the channel is cut off by a second host which begins transmitting while the first host's interface is being reset, the first host has been robbed of an opportunity to transmit, and enters state XRobbed 82. The variable BurstStart is set as undefined, and the host returns to state Start 55.

A host with an empty queue is waiting in state Sleep 77. The host simply waits for data to transmit. Once there is a data packet to transmit, the host returns to state Start 55.

In the preferred embodiment, the host has no obligation to monitor the channel to detect collisions while the queue is empty. This is because with the present invention new active hosts can quickly learn the system state. Furthermore, the disappearance of an active user between its first collision and the successful transmission of its packet does not disrupt the system. However, it is within the present invention to add additional states for the host to monitor the channel and update the collision counter while the queue is empty.

If, during the delay period created by DoBackoff, some other host transmits first, the non-transmitting hosts detect the carrier and will enter state OtherBusy 67. In state OtherBusy 67, the host first sets BurstStart to current time. Then the host waits for either the carrier to end or for a collision to occur. If there is a collision, the host proceeds to state SawCollision 60. If there is no collision the host enters state SawSucess 82.

Any time that a third-party collision occurs, the uninvolved host enters state SawCollision 60. The host sets the variable BurstStart as undefined, and increments Ccounter by one. If the collision counter exceeds the maximum value given by attemptLimit, the counter is reset to one and the host reports an excessive collision error. Then the host proceeds to state DoBackoff 57.

In contrast, if a third-party host successfully completes a transmission without a collision, then the other active hosts enter state SawSucess 82. Since the present invention allows capture of the channel for a discrete capture time BurstLength, the host must decide whether to concede control of the network to the successful host.

First, the host resets its local collision counter to one in preparation for the next arbitration period. Then, the host determines whether the network has been captured for more than the allowed capture time, reduced by the time between frames, i.e. if CurrentTime−BurstStart≧BurstLength−HostResetTime. If it has, then the variable BurstStart is set as undefined, and the host returns to state DoBackoff 57. This ensures that no single host will capture the channel for an unreasonable amount of time.

If the successful host still has not expended all of its channel capture time, then it must be permitted to send another packet without interference. At this point, no other host is transmitting. A timeout is set for twice the normal gap between frames. If a carrier (presumably from the successful host) is detected before the end of the timeout, then the host proceeds to state MoreBusy 85. On the other hand, if the timeout expires without a carrier, then the successful host must have emptied its queue of packets, and the host proceeds to state OtherDone 87.

When the successful host runs out of packets to send in a burst, the non-transmitting hosts enter state OtherDone 87. The non-transmitting hosts in state OtherDone 87 sit the variable BurstStart as undefined, and return to state DoBackoff.

When the successful host is able to transmit additional packets because it has captured the channel, the non-transmitting hosts enter state MoreBusy 85. In state MoreBusy 85, the host waits for either the end of the carrier, or for a collision. Collisions may be caused by hosts that are newly active, or by hosts using the standard Ethernet protocol rather than the present invention. If there is a collision, the host proceeds to state SawCollision. If the transmission ends without a collision, then the transmission was successful and the host returns to state SawSucess.

A distinction between the present invention and the prior Ethernet method is that the present invention uses ternary state information about all activity on the channel, such as idling, success and collision. Such ternary state information is gathered whenever a host is active. Instead of updating the counter only upon the success or failure of its own transmission attempt, the host operating according to the present invention also looks to the activities of all the other hosts. This additional information is available with little or no implementation complexity. First, carrier sensing can be used to distinguish an idle channel from a busy one. Second, an actively transmitting host can distinguish success from collision by comparing the output to the input signal with either analog voltage levels or digital logic.

However, in the present invention, a passive observer can also distinguish between a success and a collision in which it was never involved. In the present invention, the host classifies an active period as a collision if, and only if, its duration in bits, discounting the preamble, is less than the minimum frame length of 512 bits. This involves little additional work by the host because the same test is used for filtering collision fragments before passing frames to the host interface. Furthermore, no frame decoding is required.

The present invention has a fundamental advantage over the BEB method in quickness at estimating the total number of active hosts and in reacting to transient overloads. First, the present invention is a logarithmic time search for the number of active hosts. Second, the average time from the overload to the first successful packet transmission is also proportional to the logarithm of the number of active hosts.

The present invention is also more fair than the BEB method. Both the standard deviation in delay time and the worst-case access delays are significantly reduced. Furthermore, the present invention retains the benefits of the capture effect for small data packets.

The present invention makes the excessive collision error into a useful diagnostic tool. Since the collision counter is reset on each successful transmission, the error occurs when large number of hosts are competing, and not as a result of random chance in a busy system (throughput near 100%). Specifically, in the present invention, even in a busy system the collision counter rarely rises above ten, and thus excessive collision error does not occur. By contrast, in the BEB system, five or six errors may occur every ten seconds. In fact, in the present invention, the probability of falsely triggering an excessive collision error in a network with less than 128 active hosts is negligible, on the order of $10^{-14}$. The worst-case probability of a false error is about 1/491 in a saturated 1024 host network. However, one may increase the attempt limit from sixteen to twenty, which reduces the worst-case probability of falsely triggering the error to 1/23267.

The present invention is also interoperable with existing Ethernet equipment. A heterogenous network containing a mixture of old (BEB) and new (the present invention) hosts will function correctly. Not only does the heterogenous network function, but the addition of hosts using the present invention actually improves the delay characteristics of the old hosts.

The present invention has been described in terms of a preferred embodiment. The invention, however, is not limited to the embodiment depicted and described. Rather, the scope of the invention is defined by the appended claims.

What is claimed is:

1. A method of operating a subject host in a network having a plurality of hosts connected to a shared channel, said subject host having data to transmit, said method comprising the steps of:

(a) incrementing a counter for said subject host when two or more of the plurality of hosts transmit simultaneously to cause a collision;

(b) resetting said counter when a host other than said subject host successfully transmits a packet;

(c) commencing a backoff delay if
      i) a host other than said subject host successfully transmits a burst of packets equal to or greater than a predetermined length, or
      ii) a host other than said subject host successfully transmits a packet and thereafter no host transmits data for a first predetermined amount of time, or
      iii) a collision occurs, said backoff delay for said subject host generated from a random number whose distribution depends on said counter;

(d) transmitting data from said subject host at the expiration of said backoff delay, unless another host begins transmitting; and (e) if another host begins transmitting, then waiting
      i) for said other host to successfully transmit a burst of packets equal to or greater than the predetermined length, before executing step (c)(i), or
      ii) for said other host to cease transmitting for the first predetermined amount of time, before executing step (c)(ii), or
      iii) for a collision, before executing step (c)(iii).

2. The method of claim 1 wherein said random number whose distribution depends on said counter is an integer between zero and $2^{min(n,x)}-1$, where n is the value of said counter and x is a first predetermined integer.

3. The method of claim 2 wherein said first predetermined integer is ten.

4. The method of claim 2 further including the step of setting said counter equal to one if said counter equals a second predetermined integer.

5. The method of claim 4 wherein said second predetermined integer is equal to or greater than sixteen.

6. The method of claim 5 wherein said second predetermined integer is twenty.

7. The method of claim 4 further including the step of producing an error signal if said counter equals said second predetermined integer.

8. The method of claim 1 further including the step of resetting said counter if said subject host successfully transmits a packet.

9. The method of claim 1 further including the steps of resetting said counter if a subject host previously having no data to transmit gains a data packet to transmit.

10. The method of claim 9 wherein said counter is reset to one.

11. The method of claim 9 wherein said counter is reset to a value dependant upon the priority of transmission of the data packet.